US011001160B2

(12) United States Patent
Stadler et al.

(10) Patent No.: US 11,001,160 B2
(45) Date of Patent: May 11, 2021

(54) ELECTRICALLY OPERATED VEHICLE HAVING CHARGING CABLE

(71) Applicant: AUDI AG, Ingolstadt (DE)

(72) Inventors: Michael Stadler, Gaimersheim (DE); Heiko Diederichs, Kösching (DE)

(73) Assignee: AUDI AG, Ingolstadt (DE)

( * ) Notice: Subject to any disclaimer, the term of this patent is extended or adjusted under 35 U.S.C. 154(b) by 233 days.

(21) Appl. No.: 16/356,044

(22) Filed: Mar. 18, 2019

(65) Prior Publication Data
US 2019/0322190 A1 Oct. 24, 2019

(30) Foreign Application Priority Data

Apr. 20, 2018 (DE) .................... 10 2018 206 051.7

(51) Int. Cl.
 B60L 53/65 (2019.01)
 B60L 53/16 (2019.01)
 B60L 53/18 (2019.01)

(52) U.S. Cl.
 CPC ............... *B60L 53/65* (2019.02); *B60L 53/16* (2019.02); *B60L 53/18* (2019.02); *B60L 2270/32* (2013.01)

(58) Field of Classification Search
 CPC ...................................................... B60L 53/65
 USPC ........................................................ 320/109
 See application file for complete search history.

(56) References Cited

U.S. PATENT DOCUMENTS

| 9,827,950 | B2* | 11/2017 | Lovett | E05B 81/04 |
| 2011/0300733 | A1* | 12/2011 | Janarthanam | H01R 13/6392 |
| | | | | 439/304 |
| 2012/0071017 | A1* | 3/2012 | Gaul | G07F 15/005 |
| | | | | 439/304 |
| 2012/0083148 | A1* | 4/2012 | Hirashita | H01R 13/639 |
| | | | | 439/304 |
| 2012/0135634 | A1* | 5/2012 | Gaul | B60L 53/16 |
| | | | | 439/488 |
| 2014/0002018 | A1* | 1/2014 | Montemayor Cavazos | ................ |
| | | | | B60L 50/52 |
| | | | | 320/109 |

(Continued)

FOREIGN PATENT DOCUMENTS

DE 20 2010 004 148 U1 8/2010
DE 10 2009 030 092 A1 12/2010

(Continued)

OTHER PUBLICATIONS

Examination Report dated Dec. 17, 2018 of corresponding German application No. 10 2018 206 051.7; 10 pages.

(Continued)

*Primary Examiner* — Jerry D Robbins

(74) *Attorney, Agent, or Firm* — Maier & Maier, PLLC

(57) ABSTRACT

The disclosure relates to an electrically operated vehicle having an electrical charging cable, by which a vehicle-side accumulator is chargeable by a vehicle-external power supply network in a charging procedure, wherein the charging cable can be unplugged from a vehicle-side terminal at least after completion of the charging procedure, in particular independently and without locking. According to the disclosure, the vehicle and/or the charging cable has a check function, which enables a charging cable usage if a usage authorization is present and blocks the charging cable usage if a usage authorization is not present.

19 Claims, 1 Drawing Sheet

(56) References Cited

U.S. PATENT DOCUMENTS

| | | | | |
|---|---|---|---|---|
| 2014/0179141 | A1* | 6/2014 | Kojima | B60L 53/16 |
| | | | | 439/296 |
| 2015/0035478 | A1* | 2/2015 | Uchiyama | B60L 1/003 |
| | | | | 320/107 |
| 2017/0054249 | A1* | 2/2017 | Moseke | H01R 13/6397 |
| 2017/0062984 | A1* | 3/2017 | Moseke | H01R 13/639 |
| 2018/0022226 | A1* | 1/2018 | Sjodin | B60L 50/16 |
| | | | | 701/22 |
| 2018/0354459 | A1* | 12/2018 | Park | G07C 9/29 |
| 2019/0027867 | A1* | 1/2019 | Ognjanovski | B60L 53/16 |
| 2019/0066416 | A1* | 2/2019 | Dhillon | G07C 9/37 |

FOREIGN PATENT DOCUMENTS

| | | |
|---|---|---|
| DE | 10 2012 002 842 A1 | 8/2012 |
| DE | 10 2014 213 757 A1 | 1/2016 |
| JP | 2010-288319 A | 12/2010 |

OTHER PUBLICATIONS

Search Report dated May 17, 2019 in corresponding European Application No. 19158471.3; 10 pages including partial machine-generated English-language translation.

* cited by examiner

ELECTRICALLY OPERATED VEHICLE HAVING CHARGING CABLE

FIELD

The disclosure relates to an electrically operated vehicle having an electrical charging cable and a method for theft protection of a charging cable.

BACKGROUND

To charge an accumulator of an electrically operated vehicle, the accumulator is connected via the electrical charging cable to a charging station.

In a generic electrically operated vehicle, the charging cable is plugged during the charging procedure into a vehicle-side charging socket and secured therein via a locking unit. Unintentional or unauthorized unplugging of the charging cable from the vehicle-side charging socket can thus be avoided.

In regard to the increase of charging convenience, the charging cable can be automatically unlocked immediately after completion of the charging procedure to enable easy unplugging of the charging cable for the driver. However, theft protection is no longer ensured in the case of such an automatically unlocked charging cable after completion of the charging procedure.

A device for transmitting an item of identification information is known from DE 20 2010 004 148 U1. A communication unit of the charging cable is used to transmit the identification information to a charging station. A method for identifying a vehicle connected to a charging device is known from DE 10 2012 002 842 A1. In this case, an item of identification information is transmitted from the vehicle via a charging cable to the charging device. A theft protection measure for a charging cable is known from DE 10 2014 213 757 A1, in which an unauthorized withdrawal of the charging cable is registered. In this case, a blocking command is transmitted to the charging cable. Unblocking of the charging cable is implementable by inputting an unblocking code.

SUMMARY

The object of the invention is to provide an electrically operated vehicle which is functionally expanded with regard to a theft protection for the electrical charging cable.

According to the disclosure, the vehicle and/or the charging cable has an additional check function. If a usage authorization is present, the check function enables a charging cable usage. In contrast, if a usage authorization is not present, the charging cable usage is blocked. According to the invention, a check and/or an association of the charging cable with the vehicle or its owner thus takes place. In the event of a failed association, the charging cable is switched to nonfunctional and thus made unusable, which discourages the charging cable from being stolen. However, it is to be emphasized that the above-mentioned association does not apply exclusively for a single vehicle, since multiple vehicles/vehicle types, for example, of the owner are to be charged using one charging cable.

In a technical implementation, the check function can be constructed from software modules, for example, from an identification unit and an enabling unit, which have a signal connection to one another. A charging-cable-side identification code can be compared in the identification unit to at least one vehicle-side identification code. On the basis of this comparison, the identification unit can generate an authorization signal, specifically for the case of corresponding identification codes. In contrast thereto, the identification unit can generate a non-authorization signal if the two identification codes do not correspond to one another, i.e., if an invalid charging-cable-side identification code is present. The above-mentioned signals are applied to the signal input of the enabling unit. Upon the presence of the authorization signal, the enabling unit enables the charging cable usage. In contrast, the enabling unit blocks the charging cable usage if a non-authorization signal is applied to the signal input of the enabling unit.

The check function can preferably be integrated into an electronic charging cable control unit (called an E-box). The charging cable control unit has a signal connection to the vehicle-side check function, in particular via a so-called power line communication, when the charging cable is plugged into the vehicle socket, whereby different charging functions are implemented during the charging procedure (for example, ULK-High, ULK-Basic).

In one preferred refinement, the charging-cable-side identification code can be stored in the charging cable control unit (E-box). The identification code has to be unique. The code has to be stored in the control unit of the charging cable so that manipulations can be precluded, for example, by unique write-once registers in the controller.

When the charging cable is plugged in, the charging-cable-side identification code can be transmitted via the signal connection to the vehicle-side check function. If a valid charging-cable-side identification code is present, this check function then enables the charging cable usage or, in the reverse case, blocks the charging cable usage. In addition, it would be advantageous, if the energy supplier/service provider can also communicate with the charging cable, to also block the charging cable on the list of the authorized charging cable IDs if the ID is no longer valid.

The charging-cable-side identification code can be trained similarly to a key. In this case, only the trained charging cable is accepted by the vehicle. However, this solution can have the disadvantage that in the event of a defective charging cable, a different charging cable cannot simply be used, to at least charge the vehicle in this emergency case.

In contrast, an alternative solution is that a list having a plurality of charging-cable-side identification codes is stored in the check function. These are compared during the check for authorization to the registered charging-cable-side identification code. If no corresponding identification codes can be determined, this is stored in a vehicle-internal memory.

In a further embodiment, a counter unit can be associated with the check function which, if an invalid identification code is detected (or if a non-authorization is present), increments a numeric value by one, and does so until reaching a maximum value specified in the counter unit. At a numeric value less than the maximum value, the enabling unit enables the charging cable usage, although no corresponding identification codes have been determined by the identification unit. In this case, a blocking signal is generated in the enabling unit to block the charging cable usage only upon reaching the maximum value.

The above-mentioned list of charging-cable-side identification codes can be updated again and again in the vehicle-side check function, for example, by an online module installed in the vehicle or by using the online access of a mobile telephone. This list can be updated by the producer in a specified regular cycle. If the list is no longer updated, corresponding restrictions are made in the vehicle. This measure is considered to be an option to ensure that the list is also updated again and again. The updating of the ID list can be implemented, for example, by various possible data memories (the online connection to these memories is assumed, of course), namely Backend, HEMS (home energy management system), service providers, or the like.

BRIEF DESCRIPTION OF THE FIGURES

An exemplary embodiment of the invention is described hereafter on the basis of the appended figures.

In the figures.

DETAILED DESCRIPTION

Figure 1:
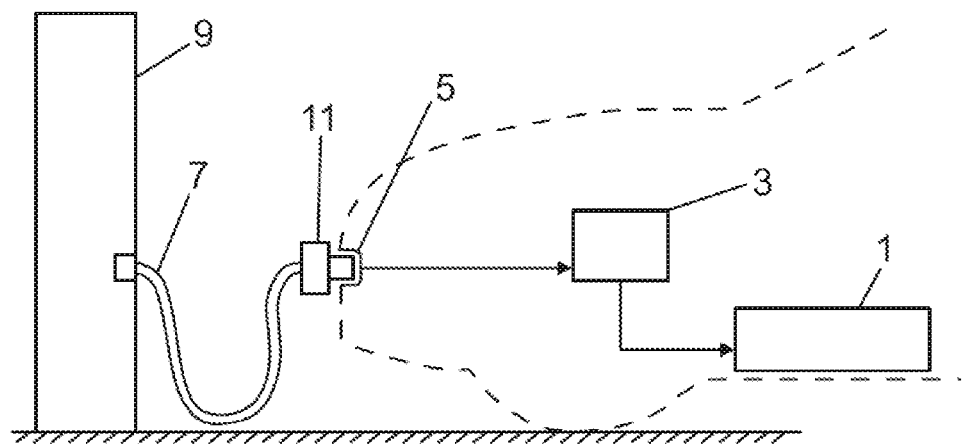
FIG. 1 shows a very schematic illustration of an electrically operated vehicle, the accumulator of which is connected via an electrical charging cable to a charging station.
Figure 2:
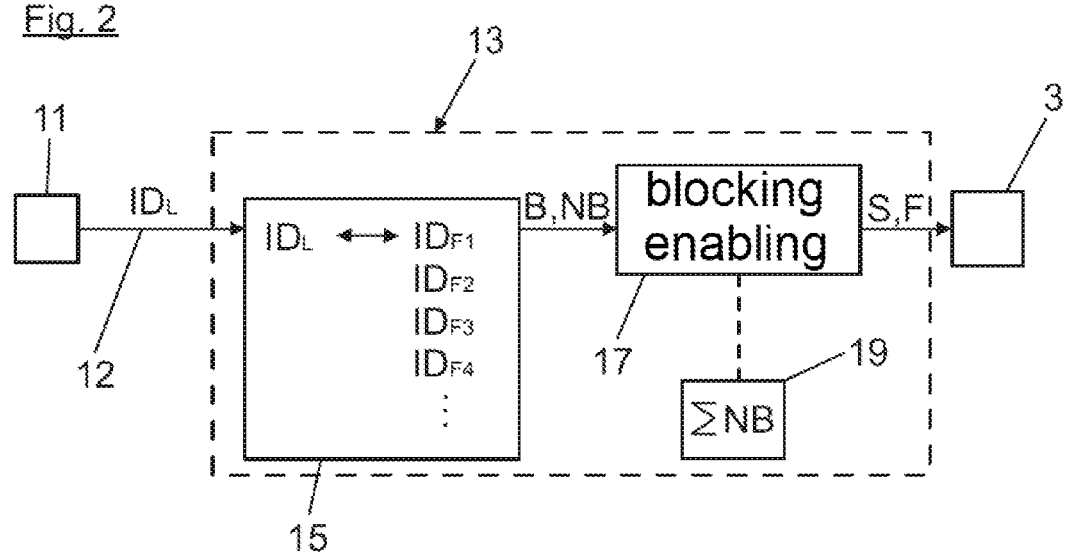
FIG. 2 shows, in a block diagram, a check function component associated with a vehicle-side charging control unit.

FIGS. 1 and 2 are only illustrated very schematically to the extent necessary to comprehend the invention. Thus, an electrically operated vehicle having an accumulator 1, which supplies an electric drive of the vehicle with electrical energy, is shown in FIG. 1. An accumulator control unit 3 and a vehicle-side charging socket 5 are associated with the accumulator 1.

A charging procedure is indicated in FIG. 1, in which a charging cable 7 is plugged both into the vehicle-side charging socket 5 and also into a vehicle-external charging station 9, by means of which the accumulator 1 is chargeable. During the charging procedure, the charging cable 7 is secured against being pulled out via a locking unit (not shown) in the vehicle-side charging socket 5. After completion of the charging procedure, in contrast, the charging cable 7 is automatically unlocked, so that the charging cable 7 can be pulled out of the vehicle-side charging socket 5 in a simple manner (without additional driver-side actuation of a locking element).

In FIG. 1, the charging cable 7 has a charging cable control unit 11, which is, during the charging procedure, for example, in a power line communication 12 (FIG. 2) with the accumulator control unit 3 to implement different charging functions during the charging procedure (for example, ULK-High, ULK-Basic). According to the invention, a charging-cable-side identification code $ID_L$ is additionally stored in the charging cable control unit 11. On the basis of the charging-cable-side identification code $ID_L$, it is checked in a check function module 13 of the accumulator control unit 3 indicated in FIG. 2 whether an authorization is present to use the charging cable 7 or not.

As shown in FIG. 2, the check function module 13 has an identification unit 15, an enabling unit 17, and a counter unit 19. The identification unit 15 has a signal connection 12 (i.e., power line communication) on the input side to the charging cable control unit 11. The charging-cable-side identification code $ID_L$ is transmitted to the identification unit 15 via the signal connection 12. The charging-cable-side identification code $ID_L$ is compared therein to a list, consisting of a plurality of vehicle-side identification codes $ID_{F1}$ to $ID_{F4}$, which are stored in the check function module 13. If the charging-cable-side identification code $ID_L$ corresponds to one of these vehicle-side identification codes $ID_{F1}$ to $ID_{F4}$, the identification unit 15 generates an authorization signal B. Otherwise, the identification unit 15 generates a non-authorization signal NB. The respective signal B, NB is applied to the signal input of the enabling unit 17. This unit generates an enabling signal F if a valid charging-cable-side identification code $ID_L$ has been recognized in the identification unit 15 (i.e., if an authorization signal B has been generated). Otherwise, the enabling unit 17 generates a blocking signal S, using which the charging cable usage is blocked. The blocking signal S or the enabling signal F, respectively, is applied to the signal input of the accumulator control unit 3.

In one refinement of the above invention, the counter unit 19 can additionally be associated with the check function module 13. This counter unit increments a numeric value by one upon detecting an invalid charging-cable-side identification code $ID_L$, and does so until reaching a maximum value. As long as the numeric value is less than the maximum value, the enabling unit 17—in spite of the presence of an invalid charging-cable-side identification code $ID_L$—generates an enabling signal F, using which the charging cable usage is enabled. The enabling unit 17 only generates a blocking signal S, to suppress the charging cable usage, upon reaching the maximum value.

The invention claimed is:

1. An electrically operated vehicle comprising:
   an electrical charging cable, by which a vehicle-side accumulator is chargeable by a vehicle-external power supply network in a charging procedure, wherein the charging cable is automatically unlocked at a vehicle-side terminal after completion of the charging procedure so as to allow the charging cable to be unplugged from the vehicle-side terminal, wherein the vehicle and/or the charging cable has a check function, which enables a charging cable usage if a usage authorization is present and blocks the charging cable usage if a usage authorization is not present; and
   wherein a counter unit is associated with the check function, which, if an invalid ID code ($ID_L$) is detected and/or if a non-authorization is present, increments a numeric value by 1 until reaching a maximum value, and wherein the check function enables the charging cable usage at a numeric value less than the maximum value, and does so in spite of the presence of a non-authorization, and wherein the check function only blocks the charging cable usage upon reaching the maximum value.

2. The electrically operated vehicle as claimed in claim 1, wherein the check function has an identification unit and an enabling unit, wherein a charging-cable-side ID code ($ID_L$) is compared in the identification unit to at least one vehicle-side ID code ($ID_F$), and wherein, on the basis of this comparison, the identification unit generates an authorization signal (B) or a non-authorization signal (NB), which is applied to the signal input of the enabling unit, and wherein the enabling unit enables the charging cable usage if the authorization signal (B) is present and blocks the charging cable usage if the non-authorization signal (NB) is present.

3. The electrically operated vehicle as claimed in claim 2, wherein the charging cable has a charging cable control unit or E-box, and wherein the charging cable control unit has a signal connection to the vehicle-side check function, in particular a power line communication, wherein the charging cable is plugged into the vehicle-side terminal, to implement different charging functions during the charging procedure.

4. The electrically operated vehicle as claimed in claim 3, wherein the charging-cable-side ID code ($ID_L$) is stored in the charging cable control unit of the charging cable and is transmittable via the signal connection to the vehicle-side check function, and/or wherein the check function enables the charging cable usage if a valid charging-cable-side ID code ($ID_L$) is present, or blocks the charging cable usage if at least one invalid charging-cable-side ID code ($ID_L$) is present.

5. The electrically operated vehicle as claimed in claim 4, wherein a list having a plurality of vehicle-side or charging-cable-side ID codes ($ID_F$) is stored in the check function, which are compared during the check for authorization to the charging-cable-side ID code ($ID_L$) and wherein enabling of the charging cable usage is performed in particular upon correspondence of the charging-cable-side ID code (IDL) with one of the vehicle-side ID codes ($ID_F$).

6. The electrically operated vehicle as claimed in claim 4, wherein a counter unit is associated with the check function, which, if an invalid ID code ($ID_L$) is detected and/or if a non-authorization is present, increments a numeric value by 1 until reaching a maximum value, and wherein the check function enables the charging cable usage at a numeric value less than the maximum value, and does so in spite of the presence of a non-authorization, and wherein the check function only blocks the charging cable usage upon reaching the maximum value.

7. The electrically operated vehicle as claimed in claim 3, wherein a list having a plurality of vehicle-side or charging-cable-side ID codes ($ID_F$) is stored in the check function, which are compared during the check for authorization to the charging-cable-side ID code ($ID_L$) and wherein enabling of the charging cable usage is performed in particular upon correspondence of the charging-cable-side ID code (IDL) with one of the vehicle-side ID codes ($ID_F$).

8. The electrically operated vehicle as claimed in claim 3, wherein a counter unit is associated with the check function, which, if an invalid ID code ($ID_L$) is detected and/or if a non-authorization is present, increments a numeric value by 1 until reaching a maximum value, and wherein the check function enables the charging cable usage at a numeric value less than the maximum value, and does so in spite of the presence of a non-authorization, and wherein the check function only blocks the charging cable usage upon reaching the maximum value.

9. The electrically operated vehicle as claimed in claim 2, wherein a list having a plurality of vehicle-side or charging-cable-side ID codes ($ID_F$) is stored in the check function, which are compared during the check for authorization to the charging-cable-side ID code ($ID_L$) and wherein enabling of the charging cable usage is performed in particular upon correspondence of the charging-cable-side ID code (IDL) with one of the vehicle-side ID codes ($ID_F$).

10. The electrically operated vehicle as claimed in claim 9, wherein the list of ID codes ($ID_{F1}$ to $ID_{F4}$) stored in the check function can be updated, for example, by an online module installed in the vehicle or by using the online access of a mobile telephone.

11. The electrically operated vehicle as claimed in claim 9, wherein a counter unit is associated with the check function, which, if an invalid ID code ($ID_L$) is detected and/or if a non-authorization is present, increments a numeric value by 1 until reaching a maximum value, and wherein the check function enables the charging cable usage at a numeric value less than the maximum value, and does so in spite of the presence of a non-authorization, and wherein the check function only blocks the charging cable usage upon reaching the maximum value.

12. The electrically operated vehicle as claimed in claim 1, wherein the charging cable usage comprises charging the vehicle via the charging cable, and wherein the check function checks an association between the charging cable and the vehicle and/or between the charging cable and an owner of the vehicle.

13. An electrically operated vehicle comprising:
an electrical charging cable, by which a vehicle-side accumulator is chargeable by a vehicle-external power supply network in a charging procedure, wherein the charging cable is automatically unlocked at a vehicle-side terminal after completion of the charging procedure so as to allow the charging cable to be unplugged from the vehicle-side terminal, wherein the vehicle and/or the charging cable has a check function, which enables a charging cable usage if a usage authorization is present and blocks the charging cable usage if a usage authorization is not present; and
wherein the check function has an identification unit and an enabling unit, wherein a charging-cable-side ID code ($ID_L$) is compared in the identification unit to at least one vehicle-side ID code ($ID_F$), and wherein, on the basis of this comparison, the identification unit generates an authorization signal (B) or a non-authorization signal (NB), which is applied to the signal input of the enabling unit, and wherein the enabling unit enables the charging cable usage if the authorization signal (B) is present and blocks the charging cable usage if the non-authorization signal (NB) is present.

14. The electrically operated vehicle as claimed in claim 13, wherein the charging cable has a charging cable control unit or E-box, and wherein the charging cable control unit has a signal connection to the vehicle-side check function, in particular a power line communication, wherein the charging cable is plugged into the vehicle-side terminal, to implement different charging functions during the charging procedure.

15. The electrically operated vehicle as claimed in claim 14, wherein the charging-cable-side ID code ($ID_L$) is stored in the charging cable control unit of the charging cable and is transmittable via the signal connection to the vehicle-side check function, and/or wherein the check function enables the charging cable usage if a valid charging-cable-side ID code ($ID_L$) is present, or blocks the charging cable usage if at least one invalid charging-cable-side ID code ($ID_L$) is present.

16. The electrically operated vehicle as claimed in claim 13, wherein a list having a plurality of vehicle-side or charging-cable-side ID codes ($ID_F$) is stored in the check function, which are compared during the check for authorization to the charging-cable-side ID code ($ID_L$) and wherein enabling of the charging cable usage is performed in particular upon correspondence of the charging-cable-side ID code (IDL) with one of the vehicle-side ID codes ($ID_F$).

17. The electrically operated vehicle as claimed in claim 16, wherein the list of ID codes ($ID_{F1}$ to $ID_{F4}$) stored in the check function can be updated, for example, by an online module installed in the vehicle or by using the online access of a mobile telephone.

18. The electrically operated vehicle as claimed in claim 13, wherein a counter unit is associated with the check function, which, if an invalid ID code ($ID_L$) is detected and/or if a non-authorization is present, increments a numeric value by 1 until reaching a maximum value, and wherein the check function enables the charging cable usage at a numeric value less than the maximum value, and does so in spite of the presence of a non-authorization, and wherein the check function only blocks the charging cable usage upon reaching the maximum value.

19. The electrically operated vehicle as claimed in claim 13, wherein the charging cable usage comprises charging the vehicle via the charging cable, and wherein the check function checks an association between the charging cable and the vehicle and/or between the charging cable and an owner of the vehicle.

\* \* \* \* \*